United States Patent
Page

[11] 3,806,926
[45] Apr. 23, 1974

[54] METHOD AND MEANS FOR JAMMING RADIO TRANSMISSION

[75] Inventor: Robert M. Page, Washington, D.C.

[73] Assignee: The United States of America as represented by the Secretary of the Navy, Washington, D.C.

[22] Filed: Aug. 6, 1945

[21] Appl. No.: 609,314

[52] U.S. Cl. ............................................. 343/18 E
[51] Int. Cl. ............................................. H04k 3/00
[58] Field of Search ................................. 343/18 E

[56] References Cited
UNITED STATES PATENTS

| | | | |
|---|---|---|---|
| 2,658,992 | 11/1953 | Byrne | 343/18 E X |
| 2,953,677 | 9/1960 | Preisman | 343/18 E X |
| 3,044,061 | 7/1962 | Richmond et al. | 343/18 E |
| 3,258,771 | 6/1966 | Harpster | 343/18 E |

Primary Examiner—T.H. Tubbesing
Attorney, Agent, or Firm—R. C. Reed

EXEMPLARY CLAIM

1. A jamming system for interfering with a pulse radar signal including a transmitter tuneable to the radar carrier frequency, a random noise generator, means connected to the output of said random noise generator for selecting random noise of frequencies above the radar pulse repetition frequency, means connected to the output of said last named means for modulating the transmitter in response to the selected random noise, and receiving means operative to reject all the modulation frequencies of said transmitter and pass the radar pulse repetition frequency, whereby the radar transmission signal having a carrier frequency substantially the same as the transmitter frequency may be monitored during operation of the transmitter.

2 Claims, 1 Drawing Figure

PATENTED APR 23 1974
3,806,926
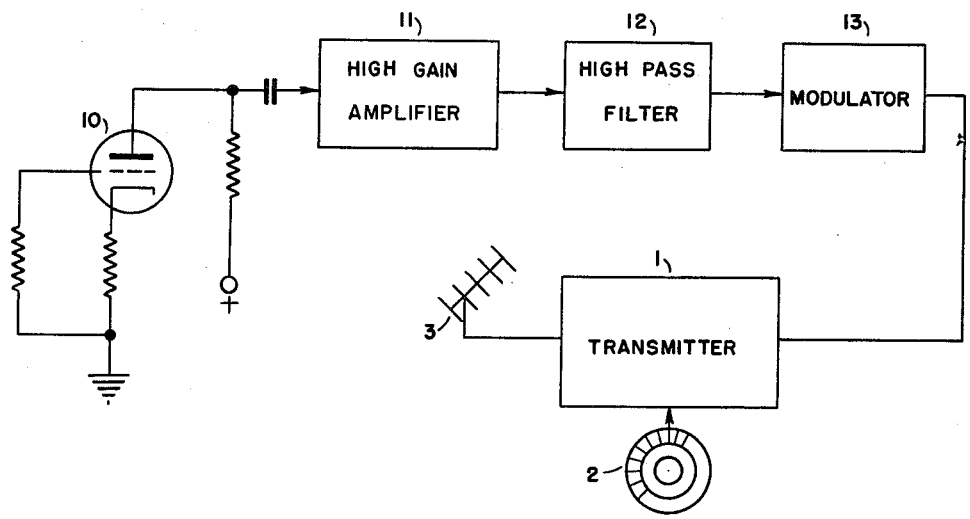
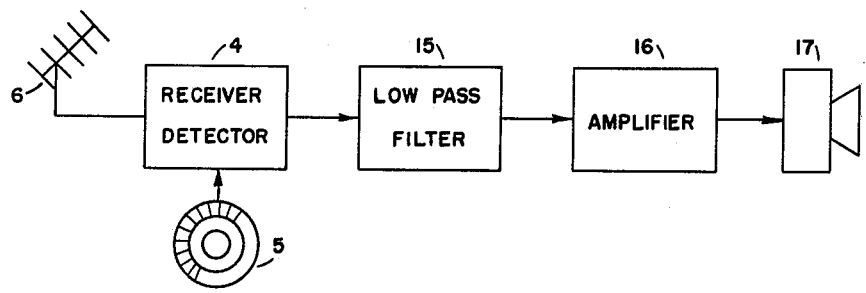
Inventor
ROBERT M. PAGE
By [signature]
Attorney

METHOD AND MEANS FOR JAMMING RADIO TRANSMISSION

The invention described herein may be manufactured and used by or for the Government of the United States of America for governmental purposes without the payment of any royalties thereon or therefor.

This invention relates to the generation of interference for jamming a radio transmission and is directed to the problem of maintaining the interfering signal on the frequency of the signal to be jammed.

In systems wherein a communication signal is interfered with, as in military operations, the interfering signal is normally interrupted for monitoring intervals to ascertain that the communication signal is still present on the same frequency. During the transmission, however, the communication signal may be shifted in frequency and such shift may not be detected before the succeeding monitoring interval.

It is accordingly the object of the invention to provide continuous monitoring of a communication signal during radiation of an interfering signal.

It will be understood that the term communication signal generically includes all useful radio transmissions.

The invention will be further described with reference to the drawing which shows in block diagram an interference transmitter and a monitoring receiver constituting an exemplary jamming system of the invention.

The system includes a transmitter 1 whose frequency is adjustable over a range by calibrated control 2. The interference signal is radiated by antenna 3, which as shown may have directional characteristics.

The communication signal is detected by a receiver 4 provided with a calibrated tuning control 5. The receiver is fed by antenna 6 which also may have directional characteristics.

According to the invention, the interfering radiation contains modulation frequency components blanketing the communication signal except for a selected band width. The monitoring receiver incorporates suitable filter components which reject the common modulating frequencies of the communication signal and the interfering signal and pass the selected modulation bandwidth of the communication signal which is free of interference components. Where the beat frequency of the jamming signal and the communication signal lie within the receiver pass band, such beat frequency will also be supplied to the output. For some purposes the jamming system may be adjusted to obtain this effect, rather than to obtain a zero beat. It is thus apparent that the presence of the communications signal may be determined during the actual jamming operation.

The transmitter 1 is, in the embodiment shown in the drawings, modulated with a continuous frequency spectrum generated in the grid circuit and otherwise in tube 10, whose noise output is fed to high gain amplifier 11. The lower frequencies are blocked by a high pass filter 12 whose output is delivered to modulator stage 13.

The receiving system includes filter components rejecting the transmitter modulation frequencies, such for instance, as low pass filter 15 which may have the same cut-off frequency as filter 12, or a lower cut-off frequency. The filter output is amplified at 16 and fed to reproducer 17. Consequently, the output of the receiving system will indicate the presence of the communication signal during operation of the transmitter. In case the frequency of the communication signal is shifted, it can be followed or relocated and its frequency determined from the calibrated receiver control 5. Suitable readjustment of the transmitter frequency can be immediately effected by control 2 to maintain interference.

It will be understood that suitable spacing or shielding arrangement of antennas 3 and 6 will be effected if necessary to avoid overloading the radio frequency components of the receiving system.

The present invention is particularly adapted for jamming radar operation, in which case the radar pulse repetition frequency will be included in the rejection frequencies of modulation filter 12. For this service, i.e., manifestly the power requirements of transmitter 1 will be very low for overriding the reflected signal level at the radar installation, and the directional characteristics of antenna 3 may be highly concentrated. The pass band of filter 15 will include the pulse repetition frequency.

It will be understood that the embodiment of the invention illustrated and described is by way of example.

I claim:

1. A jamming system for interfering with a pulse radar signal including a transmitter tuneable to the radar carrier frequency, a random noise generator, means connected to the output of said random noise generator for selecting random noise of frequencies above the radar pulse repetition frequency, means connected to the output of said last named means for modulating the transmitter in response to the selected random noise, and receiving means operative to reject all the modulation frequencies of said transmitter and pass the radar pulse repetition frequency, whereby the radar transmission signal having a carrier frequency substantially the same as the transmitter frequency may be monitored during operation of the transmitter.

2. The method of jamming a periodic signal comprising generating an interference signal of proximate frequency, generating a random noise signal, selecting random noise signals of frequencies above the periodic frequency, modulating said interference signal with said selected random noise signals, transmitting said modulated signal, and maintaining said signal on the frequency of the signal to be jammed by receiving said signals, rejecting all the modulation frequency components thereof above said predetermined frequency to isolate the low frequency components of the communication signal, reproducing said low frequency components, ascertaining the carrier frequency thereof, and adjusting the interference signal carrier frequency in accordance therewith.

* * * * *